(12) United States Patent
Dercar et al.

(10) Patent No.: US 12,070,145 B2
(45) Date of Patent: Aug. 27, 2024

(54) ADJUSTED THERMAL GENERATION FOR FOOD PROCESSING

(71) Applicant: SOCIETE DES PRODUITS NESTLE S.A., Vevey (CH)

(72) Inventors: Heinz Dercar, Vienna (AT); Bertrand Guyon, Pontarlier (FR); Johan Nieuwendijk, Vienna (AT); Wolfgang Tuider, Oberwart (AT)

(73) Assignee: Societe des Produits Nestle S.A., Vevey (CH)

( * ) Notice: Subject to any disclaimer, the term of this patent is extended or adjusted under 35 U.S.C. 154(b) by 426 days.

(21) Appl. No.: 16/766,119

(22) PCT Filed: Nov. 21, 2018

(86) PCT No.: PCT/EP2018/082002
§ 371 (c)(1),
(2) Date: May 21, 2020

(87) PCT Pub. No.: WO2019/101765
PCT Pub. Date: May 31, 2019

(65) Prior Publication Data
US 2020/0359822 A1    Nov. 19, 2020

(30) Foreign Application Priority Data
Nov. 23, 2017 (EP) ..................... 17203199

(51) Int. Cl.
*A47J 27/00* (2006.01)
*A47J 43/046* (2006.01)
*A47J 43/07* (2006.01)

(52) U.S. Cl.
CPC ......... *A47J 27/004* (2013.01); *A47J 43/0465* (2013.01); *A47J 43/0722* (2013.01)

(58) Field of Classification Search
CPC .... A47J 43/0465; A47J 43/085; A47J 27/004; A47J 27/08; A47J 27/14; A47J 43/04;
(Continued)

(56) References Cited

U.S. PATENT DOCUMENTS

| 8,172,453 B2 | 5/2012 | Boussemart et al. |
| 2012/0114815 A1 | 5/2012 | Wolfe |
| 2017/0296992 A1 | 10/2017 | Kolar et al. |

FOREIGN PATENT DOCUMENTS

| CN | 202941964 | 5/2013 |
| CN | 104095516 A | 10/2014 |

(Continued)

OTHER PUBLICATIONS

CN-205286123-U (Year: 2016).*
(Continued)

*Primary Examiner* — Vy T Nguyen
(74) *Attorney, Agent, or Firm* — K&L Gates LLP

(57) ABSTRACT

A machine (1) for processing a liquid food substance (10) includes: a container (2) having an outside wall (2″) and In delimiting a food cavity (2') for containing the food substance (10); an impeller (20) for driving the food substance (10) in the cavity (2'); a housing (3) having an outside wall and delimiting a powered cavity (3') that is adjacent the container (2) and that contains a motor (30) for driving the impeller (20) and a thermal conditioner (40) for managing heat in the food cavity (2'); and a control unit (31) for controlling the impeller motor (30) and the thermal conditioner (40). The thermal conditioner (40) has different first and second sections (41,42) extending over different first and sections of the outside housing wall (3″″). The first and second conditioner sections (41,42) are configured to generate different levels of thermal energy per cm². The first and second housing sections are adjacent to and extend over respective distinct first and second outside container wall (Continued)

sections (21,22) and/or form therewith a same first wall section and a same second wall section distinct from the same first wall section.

24 Claims, 4 Drawing Sheets

(58) Field of Classification Search
CPC .... A47J 43/044; A47J 43/046; A47J 43/0705; A47J 43/0711; A47J 43/082; A47J 44/02; B01F 33/453; B01F 2101/14; B01F 23/232; B01F 25/3121; B01F 27/50; B01F 27/707; B01F 33/05; B01F 33/053; B01F 33/45; B01F 33/452; B01F 33/4535; B01F 35/4112; A23G 9/045; A23G 9/12; A23G 9/224

USPC .............................. 366/273, 272; 261/64, 93
See application file for complete search history.

(56) References Cited

FOREIGN PATENT DOCUMENTS

| | | |
|---|---|---|
| JP | 2020527866 A | 9/2020 |
| KR | 20110003651 | 1/2011 |

OTHER PUBLICATIONS

KR20110003651A (Year: 2011).*
EP 0917847 (Year: 1999).*
Japanese Office Action for Japanese Appl No. 2020-528043 dated Jan. 17, 2023.

\* cited by examiner

ADJUSTED THERMAL GENERATION FOR FOOD PROCESSING

CROSS REFERENCE TO RELATED APPLICATIONS

The present application is a National Stage of International Application No. PCT/EP2018/082002, filed on Nov. 21, 2018, which claims priority to European Patent Application No. 17203199.9, filed on Nov. 23, 2017, the entire contents of which are being incorporated herein by reference.

FIELD OF THE INVENTION

The field of the invention pertains to machines for heating a food substance, such as milk or a milk-containing substance. For instance, the machine is provided with an impeller and an adjusted thermal management arrangement.

BACKGROUND ART

Speciality beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank. An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect. More recently, it has been proposed, as described in WO 2009/074555 and WO 2011/144647, to provide a coffee machine with this type of milk conditioning tank. An architecture to favour the evacuation of unwanted heat generated by the operation of electric components of the milk frothing appliance has been disclosed in WO 2016/202818. As disclosed in EP2016203740, such appliance can also be fitted with fan cooler. Adjusting the thermal generation and the prevention of hot spots in a tank for processing a liquid food such as milk is disclosed in WO 2017/098037.

There is still a need to adjust the management of heat in a cavity for processing a liquid food substance such as milk or a milk-based liquid.

SUMMARY OF THE INVENTION

It is a preferred object of the present invention to provide a machine for conditioning a food substance which includes an adjusted heat management configuration.

The invention thus relates to a machine for processing a liquid food substance, such as milk or a milk-based substance. The liquid food substance can be aqueous, e.g. containing coffee and/or chocolate and/or cacao.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat and/or cool milk and optionally be associated, as a standalone machine or as an integrated machine, into a coffee maker. Standalone and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into the milk, it may include an operating mode without incorporation of gas bubbles.

The machine of the invention includes a container having an outside wall and delimiting a food cavity for containing the liquid food substance. For instance, the container is provided with a removable lid for covering the cavity, e.g. as taught in WO 2008/142154.

The container can be generally cup-shaped or bowl-shaped or cylinder-shaped, the sidewall being generally upright and the bottom wall being generally flat or curved.

The container can be provided with a thermally insulating outside material and/or with a handle, for seizure and optional displacement of the container by a human hand.

Such a configuration is particularly advantageous when the food is processed at a higher temperature exceeding e.g. 50° C. or below 10° C.

The machine has an impeller for driving the liquid food substance in the food cavity. The impeller may have a spring-like structure of the type disclosed in WO 2006/050900 or in WO 2008/142154 and/or the impeller can have a wavy and/or open disc-shaped structure as taught in WO 2016/202817.

For instance, the impeller has at least one of: a surface for imparting a mechanical effect to the liquid food substance in the container cavity, such as for mixing the liquid food substance with another fluid, e.g. air; a foot for being coupled to the impeller motor, e.g. via magnetic elements in the foot; and an axle extending towards a mouth of the container when the impeller is driven by the impeller motor, e.g. an axle that is seizable by a user for removing the impeller from the container.

The motor may drive a drive member which in turn drives by magnetic coupling the impeller. The drive member can incorporate one or more magnetic elements cooperating with magnetic elements of the impeller so as to drive the impeller magnetically via a wall, such as a bottom wall and/or a sidewall, of the container. For instance, the magnetic members driving the impeller via a wall of the chamber, such as a platform wall and/or a sidewall.

At least one magnetic element of the drive member may be a magnetic field-generating element that is arranged to be magnetically coupled to a corresponding ferromagnetic element of the impeller.

At least one magnetic element of the drive member may be a ferromagnetic element that is arranged to be magnetically coupled to a corresponding magnetic field-generating element of the impeller.

At least one magnetic element of the drive member can be a magnetic field-generating element that is arranged to be magnetically coupled to a corresponding magnetic field-generating element of the impeller.

Such magnetic field-generating element(s) may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Such ferromagnetic element(s) can be made of at least one of Co, Fe, $Fe_2O_3$, $FeOFe_2O_3$, $NiOFe_2O_3$, $CuOFe_2O_3$, $MgO Fe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The magnetic coupling of the impeller, e.g. of a low inertia impeller, can be achieved as taught in WO 2006/050900 or in WO 2008/142154.

The magnetic coupling of the impeller, e.g. of a high inertia impeller, may be achieved as taught in WO 2016/202814 or EP2016203749.3.

When a high transmission torque is transmitted to the impeller via a magnetic coupling (i.e. a strong coupling), a magnetic uncoupling arrangement may be provided, e.g. as taught in WO 2016/202815.

To facilitate the movement of the impeller, if and when in contact with a container support surface, e.g. a bottom of the container, an arrangement as taught in WO 2016/202816 may be implemented.

Alternatively, the impeller may be driven by the motor via a mechanical transmission extending from the powered cavity into the food cavity, such as a mechanical transmission extending from the motor to the impeller for an uninterrupted mechanical transmission between the motor and the impeller.

Suitable impellers and their implementation into the machine are disclosed in WO 2016/202814, WO 2016/202815, WO 2016/202816 and WO 2016/202817 as well as EP 2016203727.9 and EP 2016203749.3.

The machine comprises a housing having an outside wall and delimiting an powered cavity, e.g. a cavity powered by the mains via an electric cord, that is adjacent the container. The powered cavity contains a motor for driving the impeller as well as a thermal conditioner for generating heat in the food cavity (heating the cavity) and/or for removing heat from the food cavity (cooling the cavity).

The machine includes a control unit, e.g. a unit in the powered cavity and/or fixed to the housing, for controlling the impeller motor and the thermal conditioner and possibly, when present, other electric components, e.g. a motorized ventilation arrangement For example, the control unit is configured to control the thermal conditioner for: carrying out different thermal profiles over time and/or for carrying out one or more thermal profiles of constant or variable heating and/or cooling; and/or disabling the thermal conditioner.

The thermal conditioner extends over a portion of the outside housing wall or forms such a portion. The housing wall portion extends over and is adjacent to the outside container wall and/or forms therewith a same wall portion, so as to be able to transmit thermal energy to or through the outside container wall.

The transmission of thermal energy from the thermal conditioner may be as such, e.g. a resistive or Pelletier thermal energy transmitted to the outside container wall, or the transmission of thermal energy from the thermal conditioner may be in the form of an electric and/or magnetic (e.g. an inductive) flux that is transmitted to the container for conversion in the container into a thermal energy.

The thermal conditioner has a first section extending over a first section of the outside wall portion and has a second section extending over a second section of the outside wall portion that is distinct from the first section. Hence, the first wall section may be distant to or in contact with or integral with the second wall section.

The first conditioner section is configured to generate a first thermal energy per $cm^2$ that is greater than a second thermal energy per $cm^2$ generated by the second conditioner section. The first housing section and the second housing section are adjacent to and extend over respective distinct first and second outside container wall sections of the outside container wall and/or form therewith a same first wall section and a same second wall section distinct from such same first wall section.

Hence, the machine is fitted with a thermal conditioner that is made of different thermal generating energy sections for generating different amounts of thermal energy along different sections of the container wall. Hence different areas in the food cavity can be exposed to different levels of generated thermal energy to adapt to the different needs at different locations in the food cavity.

The first and second sections of the outside container wall can be so arranged that the first outside container wall section is located below the second outside container wall section.

The first and second sections of the outside container wall may be so arranged that the first outside container wall section is located closer than the second container wall section to a corner edge formed by a bottom and a sidewall of the food cavity.

The first and second sections of the outside container wall can be so arranged that when the impeller drives the liquid food substance in the food cavity that is partly filled therewith, an average minimal distance of all particles of the liquid food substance relative to the first outside container wall section being smaller than an average minimal distance of all particles of the liquid food substance relative to the second outside container wall section.

In general, the sections of the thermal conditioner can be generally configured and located such that the outside container wall section which during processing is closer to a greater amount of liquid food substance is exposed to a greater amount of heat generated by the thermal conditioner via the corresponding conditioner section and that the container wall section which is closer to a smaller amount of liquid food substance is exposed to a smaller amount of heat generated by the thermal conditioner via the corresponding section.

For example, as illustrated in FIG. 2, when impeller rotates to drive liquid food substance 10 in food cavity 2', a kind of vortex may form with a surface 11 of substance 10 that raises towards container wall 2" from a bottom at a level 14 in cavity 2'. Hence, above level there is less liquid food substance 10 than below level 14 to absorb or release thermal energy from or to the container's wall and thus thermal conditioner 40 can be adjusted to take into account the different thermal requirements of liquid food substance 10 depending on the distribution of substance 10 in cavity 3'. In the illustrated example, first section 41 can be configured to generate more (positive or negative) thermal energy than second section 42.

The thermal conditioner can have a third section extending over a third section of the outside housing wall portion. The third conditioner section may be configured to generate a third thermal energy per $cm^2$ that is smaller than the second thermal energy per $cm^2$. The third conditioner section may be arranged so that the second section of the thermal conditioner is located between the first and third conditioner sections, the third conditioner section being adjacent to and extending over a corresponding distinct third outside container wall section of the outside container wall and/or forming therewith a same third wall section distinct from the first and second wall sections. For instance, the thermal conditioner has a fourth section extending over a fourth section of the outside housing wall portion, the fourth conditioner section being configured to generate a fourth thermal energy per $cm^2$ that is smaller than the third thermal energy per $cm^2$ and being arranged so that the third conditioner section is located between the second and fourth conditioner sections, the fourth conditioner section being adjacent to and extending over a corresponding distinct fourth outside container wall section of the outside container wall and/or forming therewith a same fourth wall section distinct from the first, second and third wall sections.

The thermal conditioner can have a third section extending over a third section of the outside housing wall portion. The third conditioner section may be configured to generate a third thermal energy per $cm^2$ that is smaller than the first thermal energy per $cm^2$. The third conditioner section may be being arranged so that the first conditioner section is located between the second and third conditioner sections, the third conditioner section being adjacent to and extending over a corresponding distinct third outside container wall section of the outside container wall and/or forming therewith a same third wall section distinct from the first and second wall sections. For instance, the thermal conditioner has a fourth section extending over a fourth section of the outside housing wall portion, the fourth section being configured to generate a fourth thermal energy per $cm^2$ that is smaller than the second or the third thermal energy per $cm^2$ and being arranged so that either the second or the third conditioner section is located between the firth and fourth conditioner sections, the fourth conditioner section being adjacent to and extending over a corresponding distinct fourth outside container wall section of the outside container wall and/or forming therewith a same fourth wall section distinct from the first, second and third wall sections.

Of course, providing a machine with three or four sections as described in the above embodiments does not exclude the presence of even more sections of thermal conditioner, outside housing wall portion and outside container wall. For instance, there may be such a large number of different sections as to form a graded continuum or near continuum of sections.

The thermal conditioner may be configured to transmit negative thermal energy, such as a cooling energy absorbing heat e.g. heat absorbed by a heat pump and/or a Peltier arrangement, or positive thermal energy, such as a heating energy emitting heat e.g. heat generated using a resistive heating circuit and/or an inductive heating circuit, to or through the external container wall, such as a resistive energy.

The thermal conditioner may include an electric conductor that emits the thermal energy when conducting an electric current.

The produced thermal energy can be a resistive thermal energy or an inductive thermal energy or a Pelletier thermal energy.

Heat can be produced directly in the wall of the container by induction from the electric conductor, e.g. a solenoid conductor, of the thermal conditioner.

The thermal conditioner may include an electrically inert holder that holds the electric conductor, e.g. a solenoid conductor.

The thermal conditioner can have a plurality of electric sections, such as the above first and second sections and optionally the above third section and possibly fourth section. Each such electric section can have at least one electric conductor connected, directly or indirectly, to a power source via corresponding connectors.

For instance, at least two sections differ from one another: dimensionally and/or materially to generate and transmit different quantities of energies when conducting the same electric current; and/or by different power sources, each electric section having a dedicated power source that can deliver an electric power that is different to a power delivered by another power source of a different electric section.

The thermal conditioner may have an electric wire of a generally constant section and material as such electric conductor(s). Each electric section can have a wire portion of a given length in which the length of one section is different to the length of another section. The sections may be in a serial or a parallel electric arrangement and connected, directly or indirectly, via connectors to one or more power sources.

The housing and the container may be configured such that the housing forms a seat, e.g. a nest, for receiving the container that has an upright extending part, the portion of the outside housing wall extending over at least part of the upright extending container part. At least part of thermal conditioner may be located inside the housing along the upright extending container part.

The housing and the container may be configured such that the container is made of one or more passive components, e.g. a passive resistor and/or a passive heat permeable material, the housing comprising all active electric components.

Motors, control units, user-interfaces, AC/DC converters can all be comprised in the housing, e.g. in the powered cavity.

The container may be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

The container can be made removable from the housing for dispensing the liquid food substance from the cavity and assemblable to the housing for processing the liquid food substance in the cavity. For instance, the housing forms a seat, e.g. generally a nest, for removably receiving the container. The housing may have an outer peripheral upright face that extends flush with an outer peripheral upright face of the container.

The housing can contain a heat evacuation system for evacuating heat from the powered cavity to a space outside such machine.

The heat evacuation system may have an arrangement for evacuating heat, e.g. as disclosed in WO 2016/202818. For example, the heat evacuation means includes a radiator, a dissipator, e.g. a ventilator, and/or a heat sink.

The heat evacuation system may include a motorized ventilation arrangement and at least one flow path extending in the powered cavity from at least one air inlet opening in the housing to at least one air outlet opening in the housing. For instance, the openings are located on a machine external bottom face and/or machine external side face(s).

Such openings or other parts of the housing can be formed as a radiator or a heat sink to contribute to the evacuation of heat from the chamber.

By providing a preferential heat evacuation path to minimise a transfer of undesired and/or uncontrolled heat into the container, the temperature in the container originates mainly from the thermal conditioner (if any) and can be not at all or not significantly influenced by the undesired heat generated within the powered cavity, e.g. generated by the motor and/or other electrical devices. Indeed such undesired heat is predominantly evacuated by the heat evacuation means to outside the machine without passing via the container.

The control unit may control the motorized ventilation arrangement.

The motorized ventilation arrangement may include a ventilation device, e.g. a fan, driven by the impeller motor. In such a configuration, the same motor can drive on the one hand the machine's impeller and on the other hand the ventilation device. Hence, the action of the heat evacuation means can be easily arranged to follow generally an increase or decrease of the action of the motor and thus an increase or decrease of power consumed by the motor. A suitable implementation of such a ventilation device is disclosed in EP2016203740.2.

The motorized ventilation arrangement can have a ventilation device, e.g. a fan, and a further motor that is different to the impeller motor. The further motor can be controlled by the control unit to drive the ventilation device. For instance, the control unit is connected to a temperature sensor located in thermal communication with the flow path for a closed loop control of the second ventilation device by the control unit.

The motorized ventilation arrangement can include a ventilation device driven by the impeller motor and a further ventilation device driven by a further motor controlled by the control unit.

Hence, the further ventilation device may be used to regulate the heat evacuation via the inlet and outlet openings that is generated by the action of the ventilation device driven by the impeller motor. The further ventilation device and the further motor may be configured to increase and/or reduce the effect of the ventilation device driven by the impeller motor. Thus, a fine adjustment of the heat evacuation from the powered cavity can be achieved.

For instance, the control unit is connected to a temperature sensor located in thermal communication with the powered cavity, e.t. with the flow path, for a closed loop control of the further ventilation device by the control unit.

The or one or more of the ventilation device(s) can have one or more air circulation members that can drive air along the flow path from the inlet opening to the outlet opening. The member(s) may have at least one of:
  a shape of a wing, blade or vane;
  a generally arched or curved shape, such as the general shape of an angular section of a cylindrical, conical, spherical, ellipsoidal or helicoidal shape;
  a generally straight shape formed of a single planar section or a plurality of angled planar sections, optionally at least one planar section, e.g. all planar sections, having a (non-zero) angle relative to a direction of motion of the circulation member;
  a plurality of companion air circulation members mounted all together in a loop, e.g. in a circle, such as on a ring or a disc, about a rotation axis, optionally the air circulation members being generally evenly distributed along the loop; and
  a configuration in which the powered cavity has a generally centrally located axis and peripheral sidewall(s), the one or more air circulation members being driven by the corresponding motor in the powered cavity about the centrally located axis, between the centrally located axis and the sidewall(s), such as at a distance from the centrally located axis in the range of ¼ to ¾ of the spacing from the centrally located axis to the sidewall(s) at the level of the air circulation member, e.g. at a distance in the range of ⅓ to ⅔ of such spacing.

Typically, the air circulation members are arranged to form a fan driven by the motor.

At least one of the impeller motor and, when present, the further motor may drive an axle, such as a motor's output shaft or an axle driven thereby. One or more of the air circulation member(s) can be mounted on the axle. The air circulation member(s) and the corresponding motor may rotate at a same rotational speed or at different rotational speeds via a transmission such as via a gear transmission e.g. a toothed gear transmission.

For instance, a gear arrangement transmits a rotational speed from the motor to the air circulation member(s) at a first transmission ratio and to the impeller at a second transmission ratio different to the first transmission ratio.

The first transmission ratio may be greater or smaller than the second transmission ratio. Whether it is greater or smaller and to which extent it is greater or smaller, may be based on the desired rotational speed of the impeller in the container (e.g. depending on the shape of the impeller and the desired result of the liquid food processing) on the one hand and the desired rotational speed of the air circulation member(s) (e.g. depending on the shape, movement path and number of the air circulation member(s) and desired air flow in the powered cavity).

The heat evacuation system may be configured so that heat generated in the powered cavity and not destined to the food cavity is evacuated predominantly via the air outlet opening(s) rather than via the food cavity. For instance, such heat is generated in the powered cavity by at least one of the impeller motor, the control unit, thermal conditioner and, when present, the further motor. The heat evacuation system can be configured so that a ratio of the heat evacuated by air outlet opening(s) over the heat evacuated by the food cavity is greater than 2.5, such as greater than 5, for example greater than 10, e.g. greater than 30.

The ventilation device, when driven by the impeller, motor may be distant to at least one inlet opening and/or to at least one air outlet opening.

The ventilation device, when driven by the above further motor, can be proximate to at least one air inlet opening and/or to at least one air outlet opening.

The ventilation device, when driven by the impeller motor, can be located in the powered cavity at a vertical level of the impeller motor or thereabove.

The ventilation device, when driven by the above further motor, can be located in the powered cavity at a vertical level of the further motor or therebelow.

The first and/or second ventilation device may rotate about a generally vertical axis.

The first and/or second ventilation device may rotate about a generally horizontal or inclined axis.

When reference is made in the present description to an orientation or position relative to the machine or parts thereof, e.g. "above" or "below" or "vertical" or "horizontal", the orientation or position takes as a reference the position and orientation of the machine in operation to process the liquid food substance in the food cavity unless specified otherwise.

"Thermal energy" may refer to calories or to electric energy that is to be converted into calories.

BRIEF DESCRIPTION OF THE DRAWINGS

The invention will now be described with reference to the schematic drawings, wherein.

DETAILED DESCRIPTION

Figure 1:
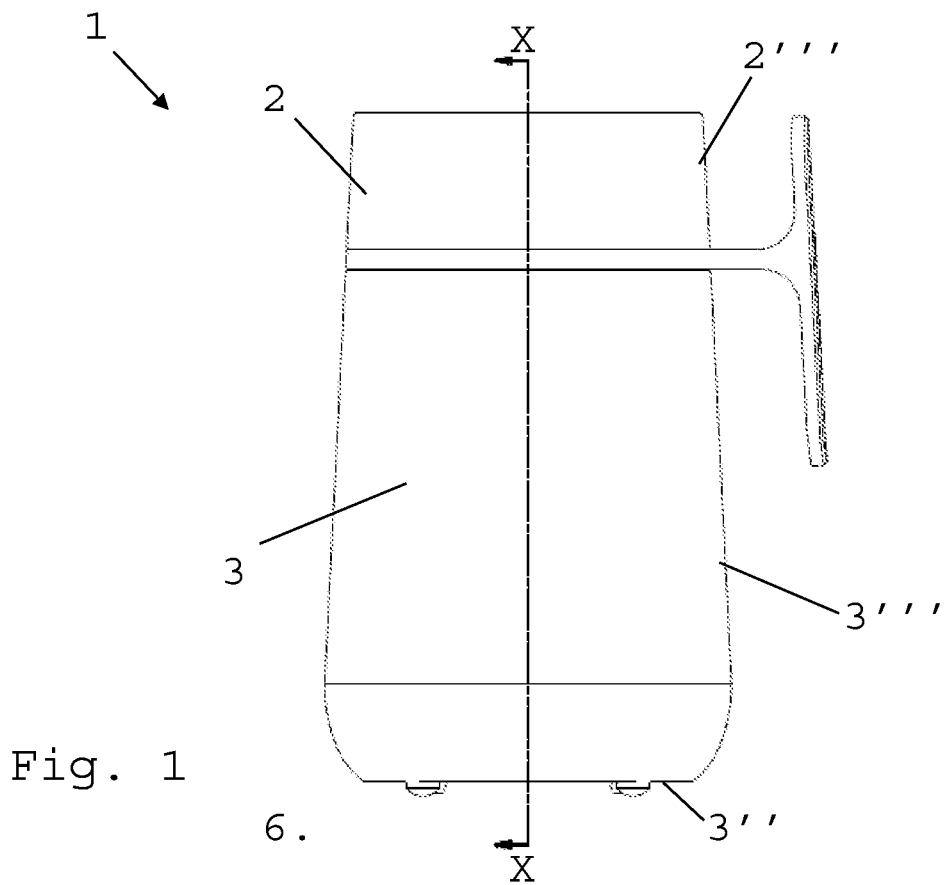
FIG. 1 is a perspective view of a machine according to the invention.
Figure 2:
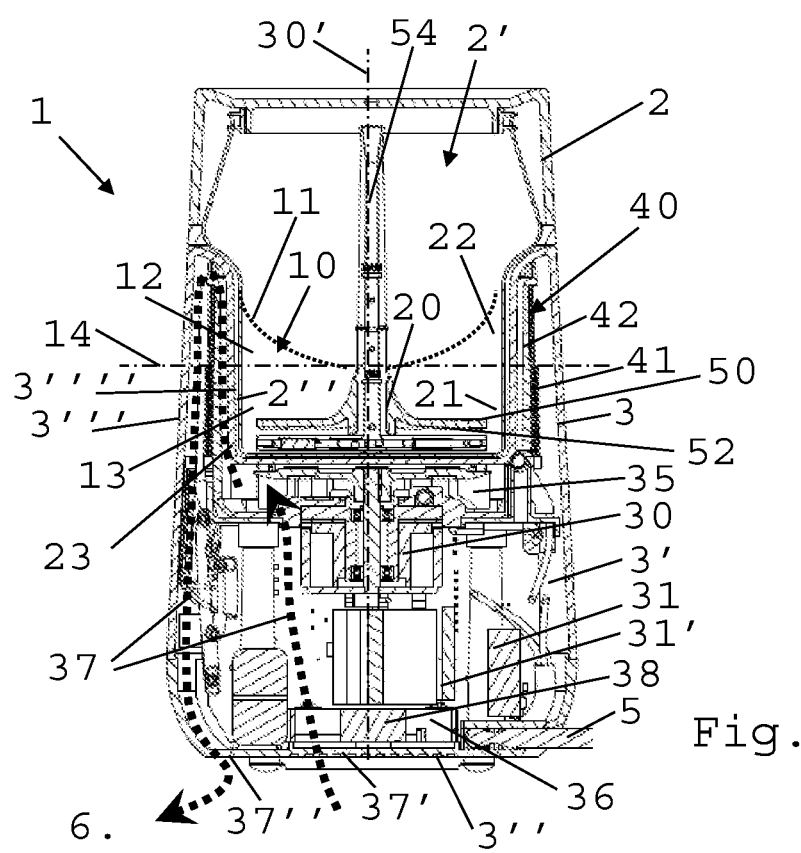
FIG. 2 is a cross-sectional view of the machine of FIG. 1 showing a container with a food cavity assembled to a housing with a powered cavity.
Figure 3:
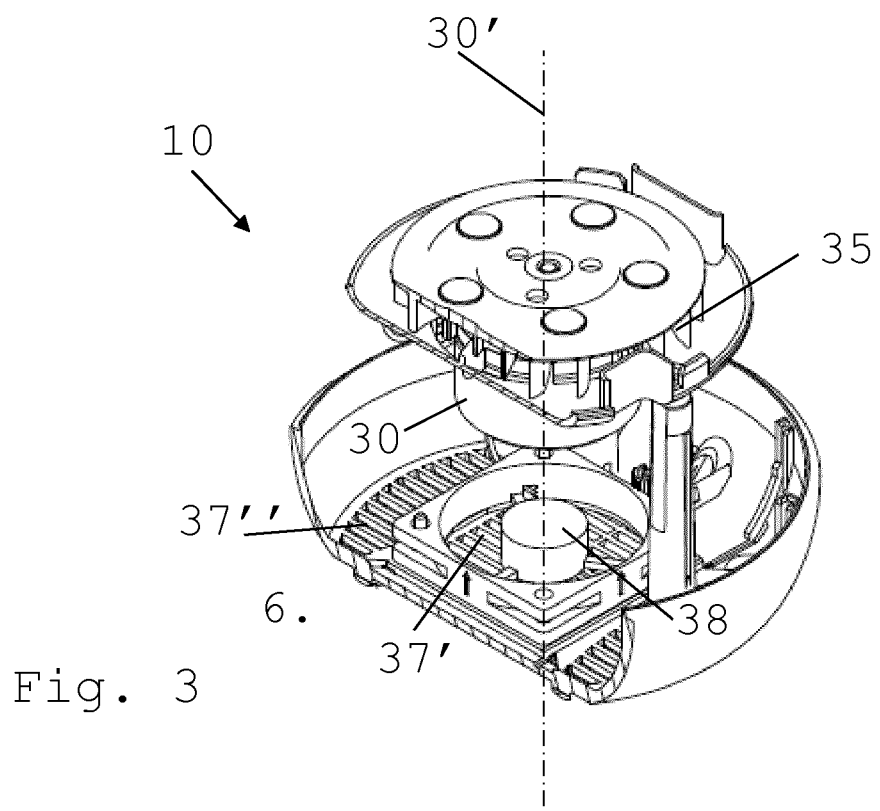
FIG. 3 shows a perspective view of a motorized ventilation arrangement to be mounted in the powered cavity of FIG. 2.
Figure 4:
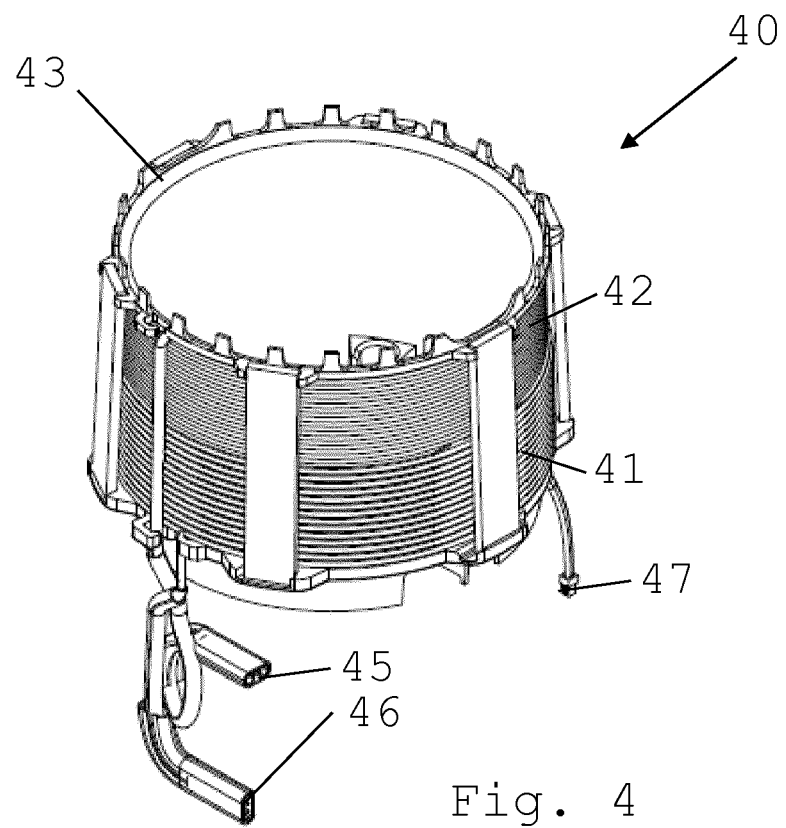
FIG. 4 shows a perspective view of a thermal conditioner illustrated in FIG. 2.

A particular embodiment of a machine 1 according to the invention is illustrated in FIGS. 1 to 4.

Machine 1 is configured for processing a liquid food substance 10 such as milk or a milk-based substance.

Machine 1 includes a container 2 having an outside wall 2" and delimiting a food cavity 2' for containing liquid food substance 10, such as a container provided with a removable lid for covering cavity 2'.

Machine 1 has an impeller 20 for driving liquid food substance 10 in food cavity 2'.

Machine 1 comprises a housing 3 having an outside wall and delimiting an electrically powered cavity 3', e.g. a cavity 3' powered by the mains via an electric cord 5, that is adjacent container 2 and that contains a motor 30 for driving impeller 20 and a thermal conditioner 40 for generating heat in food cavity 2' and/or for removing heat from food cavity 2'.

Machine 1 includes a control unit 31, e.g. a unit 31 in the powered cavity 3' and/or fixed to housing 3, for controlling impeller motor 30 and thermal conditioner 40.

Thermal conditioner 40 extends over a portion 3"" of outside housing wall or forms such a portion 3"", housing wall portion 3"" extending over and adjacent to outside container wall 2" and/or forming therewith a same wall portion, so as to be able to transmit thermal energy to or through outside container wall 2".

Impeller 20 can have at least one of: a surface for imparting a mechanical effect to liquid food substance 10 in container cavity 2', such as for mixing liquid food substance 10 with another fluid, e.g. air; a foot 50 for being coupled to impeller motor 30, e.g. via magnetic elements 52 in the foot 50; and an axle 54 extending towards a mouth of the container 2 when impeller 20 is driven by impeller motor 30, e.g. an axle 54 that is seizable by a user for removing impeller 20 from container 2.

Thermal conditioner 40 has a first section 41 extending over a first section of outside housing wall portion 3"" and has a second section 42 extending over a second section of outside housing wall portion 3"" that is distinct from the first section. First conditioner section 41 is configured to generate a first thermal energy per $cm^2$ that is greater than a second thermal energy per $cm^2$ generated by second section 42. The first housing section and the second housing section are adjacent to and extend over respective distinct first and second outside container wall sections 21,22 of outside container wall 2" and/or form therewith a same first wall section and a same second wall section distinct from such same first wall section.

For instance, sections 41,42 of thermal conditioner 40 are generally configured and located such that outside container wall section 21 which during processing is closer to a greater amount of liquid food substance is exposed to a greater amount of heat generated by thermal conditioner 40 via the corresponding conditioner section 41 and that container wall section 22 which is closer to a smaller amount of liquid food substance is exposed to a smaller amount of heat generated by the thermal conditioner 40 via corresponding section 42.

First and second sections 21,22 of outside container wall 2" can be so arranged that first outside container wall section 21 is located below second outside container wall section 22.

First and second sections 21,22 of outside container wall 2" may be so arranged that first outside container wall section 21 is located closer than second container wall section 22 to a corner edge 23 formed by a bottom and a sidewall of food cavity 2'.

First and second sections 21,22 of outside container wall 2" may be so arranged that when impeller 20 drives liquid food substance 10 in food cavity 2' that is partly filled therewith, an average minimal distance of all particles of liquid food substance 10 relative to first outside container wall section 21 is smaller than an average minimal distance of all particles of liquid food substance 10 relative to second outside container wall section 22.

Figure 5:
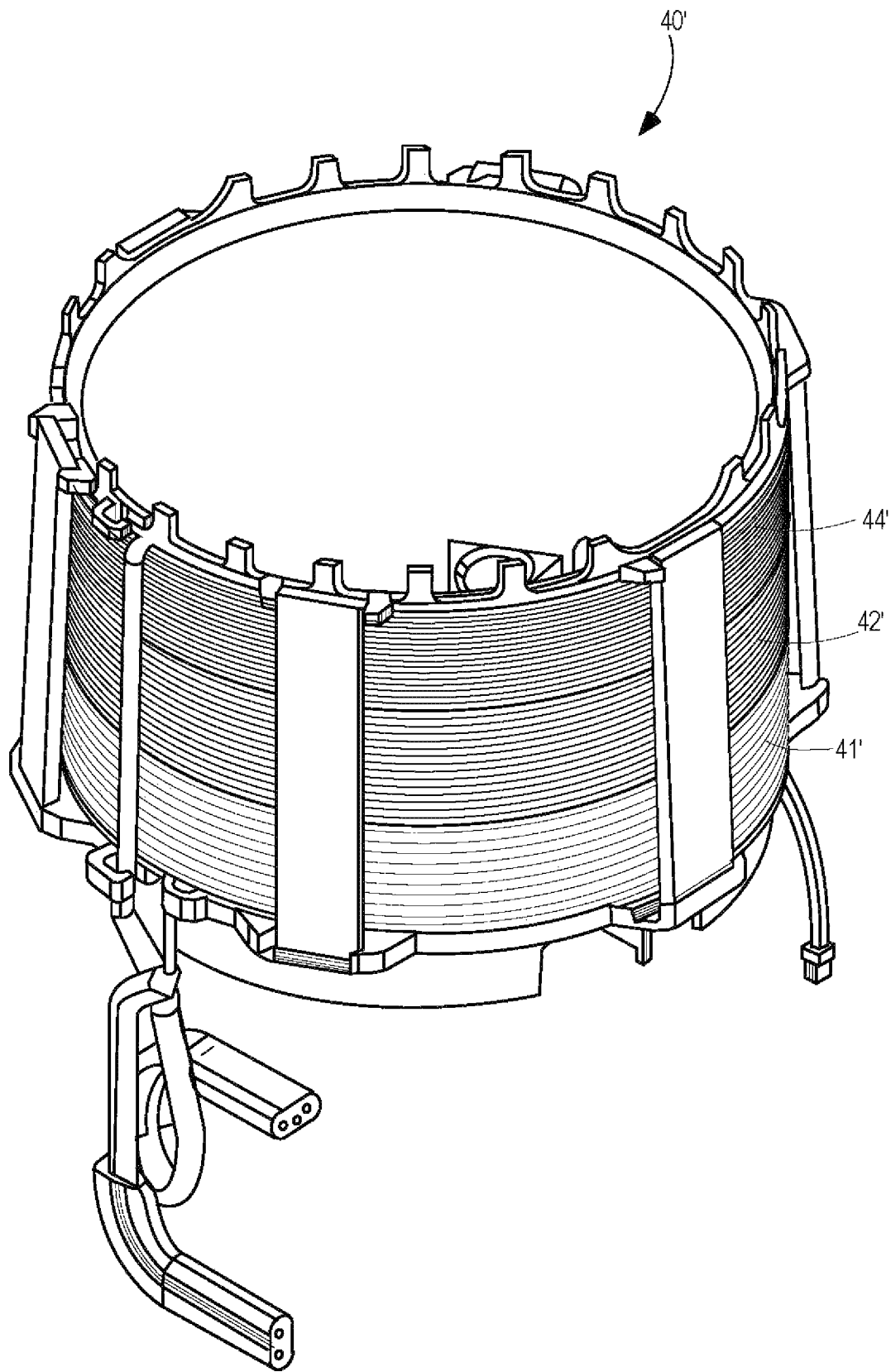
FIG. 5 shows a perspective view of an alternative embodiment of the thermal conditioner illustrated in FIG. 4.

In a further embodiment illustrated in FIG. 5, the thermal conditioner 40' can have a third section 44' extending over a third section of the outside housing wall portion, the third conditioner section 44' being configured to generate a third thermal energy per $cm^2$ that is smaller than the second thermal energy per $cm^2$. The third section 44' may be arranged so that the second section 42' of the thermal conditioner is located between the first and third conditioner sections 41', 44'. The third conditioner section 44' can be adjacent to and extend over a corresponding distinct third outside container wall section of the outside container wall and/or form therewith a same third wall section distinct from the first and second wall sections.

For instance, the thermal conditioner has a fourth section extending over a fourth section of the outside housing wall portion, the fourth conditioner section being configured to generate a fourth thermal energy per $cm^2$ that is smaller than the third thermal energy per $cm^2$. The fourth section can be arranged so that the third conditioner section is located between the second and fourth conditioner sections. The fourth conditioner section may be adjacent to and extending over a corresponding distinct fourth outside container wall section of the outside container wall and/or forming therewith a same fourth wall section distinct from the first, second and third wall sections.

Figure 6:
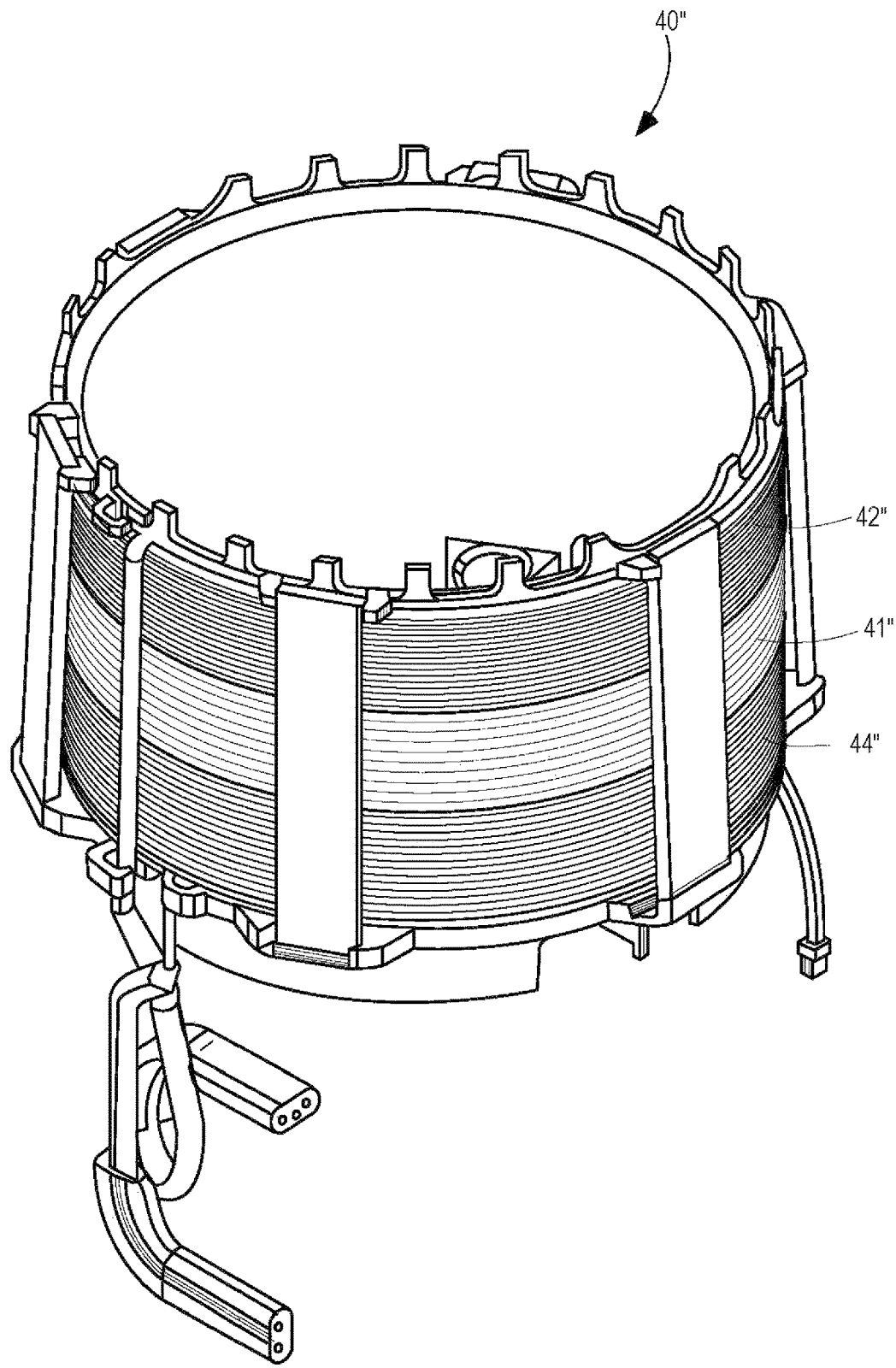
FIG. 6 shows a perspective view of a further alternative embodiment of the thermal conditioner illustrated in FIG. 4.

In a further embodiment illustrated in FIG. 6, the thermal conditioner 40" may have a third section 44" extending over a third section of the outside housing wall portion, the third conditioner section 44" being configured to generate a third thermal energy per $cm^2$ that is smaller than the first thermal energy per $cm^2$ and being arranged so that the first conditioner section 41" is located between the second and third conditioner sections 42", 44". The third conditioner section 44" can be adjacent to and extend over a corresponding distinct third outside container wall section and/or form therewith a same third wall section distinct from the first and second wall sections.

The thermal conditioner can have a fourth section extending over a fourth section of the outside housing wall portion, the fourth section being configured to generate a fourth thermal energy per $cm^2$ that is smaller than the second or the third thermal energy per $cm^2$. The fourth section can be arranged so that either the second or the third conditioner section is located between the firth and fourth conditioner sections. The fourth conditioner section may be adjacent to and extend over a corresponding distinct fourth outside container wall section and/or form therewith a same fourth wall section distinct from the first, second and third wall sections.

The thermal conditioner 40 can be configured to transmit negative thermal energy, such as a cooling energy absorbing heat e.g. heat absorbed by a heat pump and/or a Peltier arrangement, or positive thermal energy, such as a heating energy emitting heat e.g. heat generated using a resistive heating circuit and/or an inductive heating circuit, to or through the external container wall 2", such as a resistive energy.

Thermal conditioner 40 may include an electric conductor 41,42,45,46,47 that emits the thermal energy when conducting an electric current.

Thermal conditioner 40 may have an electrically inert holder 43 that holds the electric conductor.

The produced thermal energy can be a resistive thermal energy or an inductive thermal energy or a Pelletier thermal energy.

Thermal conditioner 40 can include a plurality of electric sections 41,42, such as such first and second sections 41,42 and optionally, when present, the above third section and possibly the above fourth section. Each electric section can include at least one electric conductor connected, directly or indirectly, to a power source via corresponding connectors 45,47;46,47.

At least two electric sections 41,42 may differ from one another: dimensionally and/or materially to generate and transmit different quantities of energies when conducting the same electric current; and/or by different power sources 45,46, each electric section 41,42 having a dedicated power source that can deliver an electric power that is different to a power delivered by another power source of a different electric section 42,41.

For instance, thermal conditioner 40 has an electric wire of a generally constant section and material as such electric conductor(s). Each electric section 41,42 may have a wire portion of a given length in which the length of one section 41 is different to the length of another section 42, the sections being in a serial or a parallel electric arrangement and connected, directly or indirectly, via connectors 45,47; 46,47 to one or more power sources.

Housing 3 and container 2 can be configured such that housing 3 forms a seat, e.g. a nest, for receiving container 2 that has an upright extending part. Portion 3"" of the outside housing wall may extend over at least part of the upright extending container part, whereby at least part of thermal conditioner 40 is located inside housing 3 along the upright extending container part.

Housing 3 and container 2 may be be configured such that container 2 is made of one or more passive components, e.g. a passive resistor and/or a passive heat permeable material, whereas housing 3 may include all active electric components.

Container 2 can be made removable from housing 3 for dispensing liquid food substance 10 from cavity 2' and assemblable to housing 3 for processing liquid food substance 10 in cavity 2'. For instance, housing 3 forms a seat, e.g. generally a nest, for removably receiving container 2. Housing 3 may have an outer peripheral upright face 3''' that extends flush with an outer peripheral upright face 2''' of container 2.

Housing 3 may contain a heat evacuation system 35,36, 37,37',37" for evacuating heat from powered cavity 3' to a space 6 outside such machine 1.

The system may include a motorized ventilation arrangement 35,36 and at least one flow path 37 extending in powered cavity 3' from at least one air inlet opening 37' in housing 3 to at least one air outlet opening 37" in housing 3. For instance, th openings 37',37" are located on a machine external bottom face 3" and/or machine external side face(s) 3'''. Control unit 31 may control motorized ventilation arrangement 35,36.

The motorized ventilation arrangement may include a ventilation device 35, e.g. a fan, driven by impeller motor 30.

The motorized ventilation arrangement may include a ventilation device 36, e.g. a fan, and a further motor 38 that is different to impeller motor 30, further motor 38 being controlled by control unit 31 to drive ventilation device 36. For instance, control unit 31 is connected to a temperature sensor 31' located in thermal communication with flow path 37 for a closed loop control of second ventilation device 36 by control unit 31.

The or one or more ventilation device(s) 35,36 can have one or more air circulation members that can drive air along flow path 37 from inlet opening 37' to outlet opening 37". The member(s) may have at least one of:

- a shape of a wing, blade or vane;
- a generally arched or curved shape, such as the general shape of an angular section of a cylindrical, conical, spheroidal, elliptoidal or helicoidal shape;
- a generally straight shape formed of a single planar section or a plurality of angled planar sections, optionally at least one planar section, e.g. all planar sections, having a (non-zero) angle relative to a direction of motion of the circulation member;
- a plurality of companion air circulation members mounted all together in a loop, e.g. in a circle, such as on a ring or a disc, about a rotation axis, optionally the air circulation members being generally evenly distributed along the loop; and
- a configuration in which powered cavity 3' has a generally centrally located axis 30' and peripheral sidewall(s) 3''', the one or more air circulation members being driven by corresponding motor 30,38 in powered cavity 3' about centrally located axis 30', between the centrally located axis (30') and the sidewall(s) (3'''), such as at a distance from the centrally located axis (30') in the range of ¼ to ¾ of the spacing from the centrally located axis (30') to the sidewall(s) (3''') at the level of the air circulation member, e.g. at a distance in the range of ⅓ to ⅔ of such spacing.

Typically, the air circulation members are arranged to form a fan driven by corresponding motor 30,38.

At least one of impeller motor 30 and, when present, further motor 38 may drive an axle, such as a motor's output shaft or an axle driven thereby. One or more of the air circulation member(s) can be mounted on the axle, the air circulation member(s) and the corresponding motor 30,38 rotating for instance at a same rotational speed or at different rotational speeds via a transmission such as via a gear transmission e.g. a toothed gear transmission.

Heat evacuation system 35,36,37,37',37" can be configured so that heat generated in powered cavity 3' and not destined to food cavity 2' is evacuated predominantly via air outlet opening(s) 37" rather than via food cavity 2'. For instance, such heat is generated in the powered cavity 3' by at least one of impeller motor 30, control unit 31, thermal conditioner 40 and, when present, further motor 38. The heat evacuation system can be configured so that a ratio of the heat evacuated by air outlet opening(s) 37" over the heat evacuated by the food cavity 2' is greater than 2.5, such as greater than 5, for example greater than 10, e.g. greater than 30.

Ventilation device 35, when driven by impeller motor 30, can be distant to at least one air inlet opening 37' and/or to at least one air outlet opening 37".

Ventilation device 36, when driven by further motor 38, can be proximate to at least one air inlet opening 37' and/or to at least one air outlet opening 37".

Ventilation device 35, when driven by impeller motor 30, can be located in the powered cavity 3' at a vertical level of impeller motor 30 or thereabove.

Ventilation device 36, when driven by further motor 38, can be located in powered cavity 3' at a vertical level of further motor 38 or therebelow.

First and/or second ventilation device 35,36 may rotate about a generally vertical axis 30'.

The first and/or second ventilation device may rotate about a generally horizontal or inclined axis.

The invention claimed is:

1. A machine for processing a liquid food substance, the machine comprising:
    a container having an outside container wall and delimiting a food cavity configured for containing the liquid food substance;
    an impeller configured for driving the liquid food substance in the food cavity;
    a housing having an outside housing wall and delimiting a powered cavity that is adjacent the container, the housing containing a motor configured for driving the impeller and a thermal conditioner configured for at least one activity selected from the group consisting of generating heat in the food cavity and removing heat from the food cavity; and
    a control unit configured for controlling the motor and the thermal conditioner,
    the thermal conditioner extending over or forming a portion of the outside housing wall, the outside housing wall adjacent or including the thermal conditioner extending over and adjacent to or forming a portion of the outside container wall to be able to transmit thermal energy to or through the outside container wall,
    the thermal conditioner has:
        a first conditioner section extending over a first section of the outside housing wall; and
        a second conditioner section extending over a second section of the outside housing wall that is distinct from the first section,
        the first conditioner section being configured to generate a first thermal energy per $cm^2$ that is greater than a second thermal energy per $cm^2$ generated by the second conditioner section, the first section and the second section of the outside housing wall being adjacent to and extending over or forming a first section and a second section of the portion of the outside container wall.

2. The machine of claim 1, wherein the first section of the outside container wall is located below the second section of the outside container wall.

3. The machine of claim 1, wherein the first section of the outside container wall is located closer to a corner edge formed by a bottom and a sidewall of the food cavity than the second section of the outside container wall.

4. The machine of claim 1, wherein, when the impeller drives the liquid food substance in the food cavity, an average minimal distance of all particles of the liquid food substance relative to the first section of the outside container wall is smaller than an average minimal distance of all particles of the liquid food substance relative to the second section of the outside container wall.

5. The machine of claim 1, wherein the thermal conditioner has a third conditioner section extending over a third section of the portion of the outside housing wall, the third conditioner section being configured to generate a third thermal energy per $cm^2$ that is smaller than the second thermal energy per $cm^2$, the second conditioner section of the thermal conditioner is located between the first conditioner section and the third conditioner section, the third conditioner section being adjacent to and extending over or forming a third section of the outside container wall.

6. The machine of claim 1, wherein the thermal conditioner has a third conditioner section extending over a third section of the portion of the outside housing wall, the third conditioner section being configured to generate a third thermal energy per cm² that is smaller than the first thermal energy per cm², the first conditioner section is located between the second conditioner section and the third conditioner section, the third conditioner section being adjacent to and extending over or forming a third section of the outside container wall.

7. The machine of claim 1, wherein the thermal conditioner is configured to transmit negative thermal energy to or through the outside container wall.

8. The machine of claim 1, wherein the thermal conditioner comprises an electric conductor configured to emit the first thermal energy and the second thermal energy when conducting an electric current.

9. The machine of claim 8, wherein the first conditioner section and the second conditioner section differ from one another in at least one aspect selected from the group consisting of:
   dimensionally or materially to generate and transmit different quantities of energies when conducting the same electric current; and
   by different power sources, each of the first conditioner section and the second conditioner section has a dedicated power source that can deliver an electric power that is different than an electric power delivered by another power source to the other of the first conditioner section and the second conditioner section.

10. The machine of claim 1, wherein the housing and the container are configured such that:
    the housing forms a seat configured for receiving the container, the seat having an upright extending part, the portion of the outside housing wall extending over at least part of the upright extending part, wherein at least part of the thermal conditioner is located inside the housing along the upright extending part; and/or
    the container is made of one or more passive components, and the housing comprises all active electric components.

11. The machine of claim 1, wherein the container is removable from the housing for dispensing the liquid food substance from the food cavity and assemblable to the housing for processing the liquid food substance in the food cavity.

12. The machine of claim 1, wherein the housing contains a heat evacuation system configured for evacuating heat from the powered cavity to a space outside the machine, the heat evacuation system comprising a motorized ventilation arrangement and at least one flow path extending in the powered cavity from at least one air inlet opening in the housing to at least one air outlet opening in the housing, the control unit configured for controlling the motorized ventilation arrangement.

13. The machine of claim 12, wherein the motorized ventilation arrangement comprising a ventilation device, the control unit configured for controlling the ventilation device, and the ventilation device configured to drive air along the at least one flow path.

14. The machine of claim 12, wherein the motorized ventilation arrangement comprises a ventilation device and a further motor that is different than the motor, the control unit configured for controlling the further motor to drive the ventilation device.

15. The machine of claim 12, wherein the heat evacuation system is configured to evacuate heat generated in the powered cavity via the at least one air outlet opening, wherein a ratio of the heat evacuated by the at least one air outlet opening over the heat evacuated by the food cavity is greater than 2.5.

16. The machine of claim 1, wherein the impeller has at least one of:
    a surface configured for imparting a mechanical effect to the liquid food substance in the container cavity;
    a foot configured for being coupled to the motor; and
    an axle extending towards a mouth of the container when the impeller is driven by the motor.

17. The machine of claim 16, wherein the impeller has the foot configured for being coupled to the motor, and wherein the foot is coupled to the motor via magnetic elements in the foot.

18. The machine of claim 16, wherein the impeller has the axle extending towards the mouth of the container when the impeller is driven by the motor, the axle being seizable by a user for removing the impeller from the container.

19. The machine of claim 15, wherein the heat generated in the powered cavity comprises heat generated by at least one of the motor, the control unit, the thermal conditioner, and a further motor.

20. The machine of claim 1, wherein the first conditioner section and the second conditioner section have different thicknesses.

21. The machine of claim 20, wherein the first conditioner section has a first thickness greater than a a second thickness of the second conditioner section.

22. A machine for processing a liquid food substance, the machine comprising:
    a container having an outside container wall and delimiting a food cavity configured for containing the liquid food substance;
    an impeller configured for driving the liquid food substance in the food cavity; and
    a housing having an outside housing wall and delimiting a powered cavity that is adjacent the container, the housing containing a motor configured for driving the impeller and a thermal conditioner configured for at least one activity selected from the group consisting of generating heat in the food cavity and removing heat from the food cavity;
    the thermal conditioner extending over or forming a portion of the outside housing wall, the outside housing wall adjacent or including the thermal conditioner extending over and adjacent to or forming a portion of the outside container wall to be able to transmit thermal energy to or through the outside container wall,
    the thermal conditioner has:
      a first conditioner section extending over a first section of the outside housing wall; and
      a second conditioner section extending over a second section of the outside housing wall that is distinct from the first section,
      the first conditioner section being configured to generate a first thermal energy per cm² that is greater than a second thermal energy per cm² generated by the second conditioner section, the first section and the second section of the outside housing wall being adjacent to and extending over or forming a first section and a second section of the portion of the outside container wall.

23. The machine of claim 22, wherein the first conditioner section and the second conditioner section have dimensionally different widths.

24. The machine of claim 23, wherein the first conditioner section has a first width greater than a a second width of the second conditioner section.

\* \* \* \* \*